(12) United States Patent
Nayak et al.

(10) Patent No.: US 12,548,131 B2
(45) Date of Patent: Feb. 10, 2026

(54) APPARATUS AND METHODS FOR ASSESSING GEOSPATIAL AERIAL IMAGES FOR IMAGE PROCESSING

(71) Applicant: HERE GLOBAL B.V., Eindhoven (NL)

(72) Inventors: Amarnath Nayak, Mumbai (IN); Leon Stenneth, Chicago, IL (US); Alex Averbuch, Buffalo Grove, IL (US); Sandeep Belgaonkar, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 571 days.

(21) Appl. No.: 17/990,526

(22) Filed: Nov. 18, 2022

(65) Prior Publication Data

US 2024/0169508 A1    May 23, 2024

(51) Int. Cl.
   *G06T 7/00*   (2017.01)
(52) U.S. Cl.
   CPC .. *G06T 7/0002* (2013.01); *G06T 2207/10032* (2013.01); *G06T 2207/30168* (2013.01)
(58) Field of Classification Search
   CPC ......... G06T 7/0002; G06T 2207/10032; G06T 2207/30168
   See application file for complete search history.

(56) References Cited

U.S. PATENT DOCUMENTS

| | | | |
|---|---|---|---|
| 9,069,794 B1 | 6/2015 | Bandukwala et al. | |
| 9,483,952 B2 * | 11/2016 | Chew | G08G 5/80 |
| 9,626,589 B1 * | 4/2017 | Graham | A61B 8/5253 |
| 9,672,734 B1 * | 6/2017 | Ratnasingam | G08G 1/096741 |
| 10,796,425 B1 * | 10/2020 | Patel | G06T 7/0004 |
| 10,963,744 B2 | 3/2021 | Sewak | |
| 11,403,846 B2 * | 8/2022 | Guo | A01B 79/005 |
| 11,454,500 B2 * | 9/2022 | Hofmann | G06N 3/0464 |
| 11,842,538 B2 * | 12/2023 | Saxena | H04L 67/52 |
| 2013/0262482 A1 | 10/2013 | Bogart et al. | |

(Continued)

FOREIGN PATENT DOCUMENTS

CA    2 734 613 A1    2/2010

OTHER PUBLICATIONS

Bhattacharjee, et al., "Spoofing Deep Face Recognition With Custom Silicone Masks," 978-1-5386-7180-1/18/c 2018 IEEE, 7 pages.

*Primary Examiner* — Santiago Garcia
(74) *Attorney, Agent, or Firm* — Peter H. Yu; HERE GLOBAL B.V.

(57) ABSTRACT

An apparatus, method and computer program product are provided for assessing geospatial aerial images for image processing. In one example, the apparatus receives a plurality of geospatial aerial images, where each of the plurality of geospatial aerial image data represents a zone within a map. The apparatus selects a bounding zone within the map for image processing and, in response to the bounding zone including a subset of the plurality of geospatial aerial images, the apparatus accepts or rejects the subset for the image processing based on one or more attributes of the subset. The one or more attributes is a resolution of each of the subset, an amount of area within the bounding zone covered by the subset, a clarity of each of the subset, an amount of gap or overlap between the subset, or a combination thereof.

17 Claims, 7 Drawing Sheets

(56) References Cited

U.S. PATENT DOCUMENTS

| | | | |
|---|---|---|---|
| 2015/0055820 A1* | 2/2015 | Vatsavai | G06V 10/50 |
| | | | 382/103 |
| 2015/0154786 A1* | 6/2015 | Furukawa | H04N 19/46 |
| | | | 345/419 |
| 2015/0243073 A1* | 8/2015 | Chen | G06T 17/20 |
| | | | 345/419 |
| 2018/0109767 A1 | 4/2018 | Li et al. | |
| 2018/0268453 A1 | 9/2018 | Glasgow et al. | |
| 2019/0138849 A1* | 5/2019 | Zhang | G06V 10/764 |
| 2020/0072610 A1* | 3/2020 | Hofmann | G06V 20/176 |
| 2020/0143212 A1* | 5/2020 | Okazaki | G06V 20/176 |
| 2020/0234488 A1 | 7/2020 | Holzer et al. | |
| 2021/0232818 A1* | 7/2021 | Saxena | G06N 3/0464 |
| 2021/0374909 A1 | 12/2021 | Chen et al. | |
| 2022/0327722 A1* | 10/2022 | Justus | G06V 10/26 |
| 2023/0117617 A1* | 4/2023 | Ma | B60W 60/00 |
| | | | 701/23 |
| 2023/0206625 A1* | 6/2023 | Ledner | G06V 20/176 |
| | | | 382/103 |
| 2023/0368121 A1* | 11/2023 | Carrillo Garcia | G08G 3/00 |
| 2024/0393805 A1* | 11/2024 | Motoyama | B64C 39/02 |

\* cited by examiner

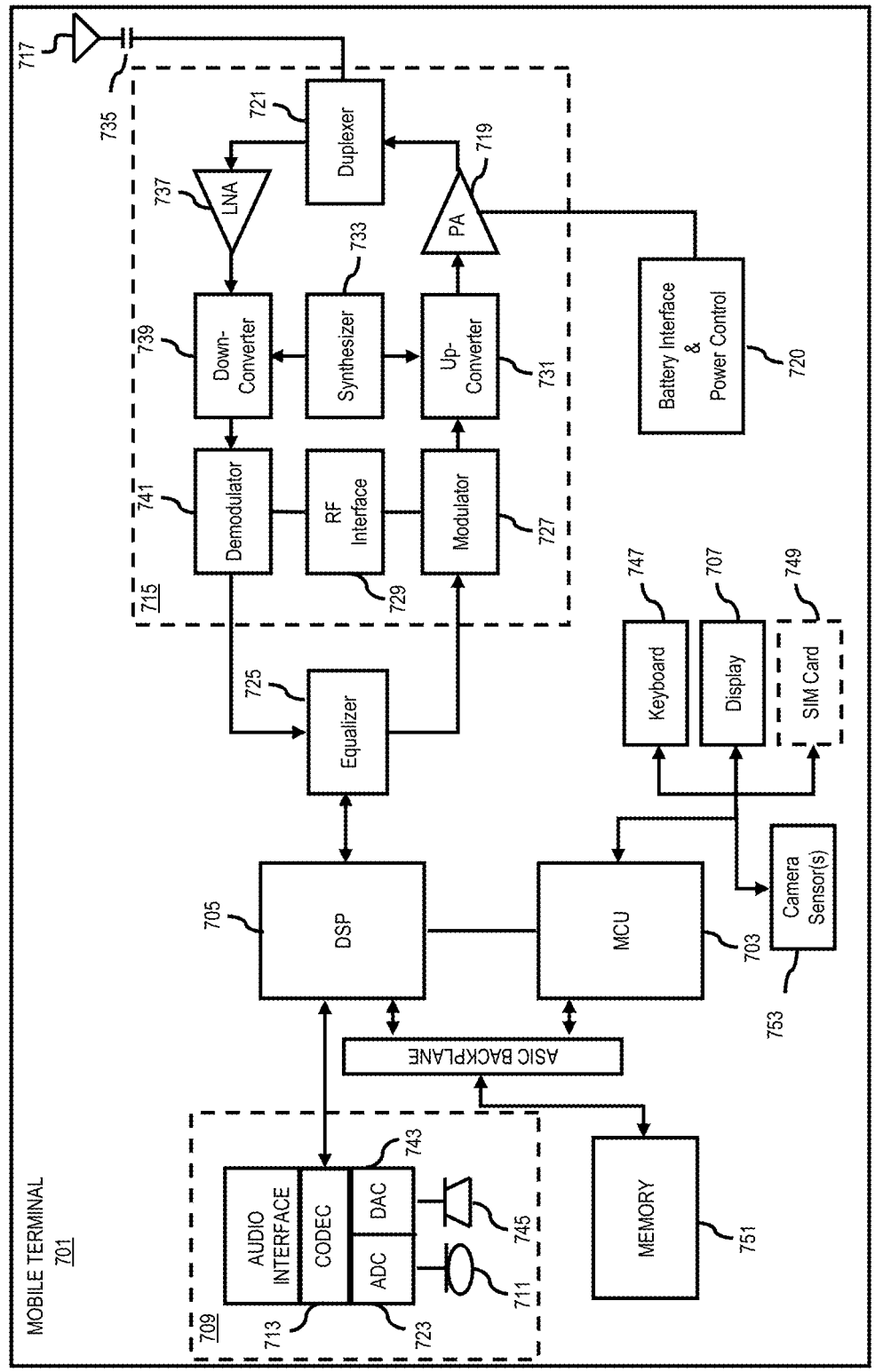

APPARATUS AND METHODS FOR ASSESSING GEOSPATIAL AERIAL IMAGES FOR IMAGE PROCESSING

TECHNICAL FIELD

The present disclosure generally relates to the field of image processing, associated methods and apparatus, and in particular, concerns, for example, an apparatus configured to assess geospatial aerial images for image processing based on attributes and quality of the images.

BACKGROUND

Geospatial aerial image data are used for various map-based applications, such as navigation-based applications. Such data may also be used to extract road attributes, such as poles, barriers, lane marking, etc., and the attributes may be input to live maps after extraction. Third party geospatial aerial image data may be acquired and used for an additional level of confirmation and coverage. However, third party geospatial aerial image data may often include varying attributes, such as image resolution, thereby rendering internal systems difficult to process said data for image processing. Additionally, if said data include variance in image quality, coverage, light attributes, seasons, weather conditions, etc., the internal systems may not be able to process the data for providing desired map-based applications.

The listing or discussion of a prior-published document or any background in this specification should not necessarily be taken as an acknowledgement that the document or background is part of the state of the art or is common general knowledge.

BRIEF SUMMARY

According to one aspect, an apparatus comprising at least one processor and at least one non-transitory memory including computer program code instructions is described. The computer program code instructions, when executed, cause the apparatus to: receive a plurality of geospatial aerial images, wherein each of the plurality of geospatial aerial image data represents a zone within a map; receive a selection of a bounding zone within the map for image processing; and responsive to the bounding zone including a subset of the plurality of geospatial aerial images: determine one or more attributes of the subset, wherein the one or more attributes is a resolution of each of the subset, an amount of area within the bounding zone covered by the subset, a clarity of each of the subset, an amount of gap or overlap between the subset, or a combination thereof; and accept or reject the subset for the image processing based on the one or more attributes.

In various embodiments, the computer program code instructions are configured to, when executed, cause the apparatus to, responsive to accepting the subset, perform the image processing for a map-based application.

In various embodiments, the subset is a first subset, the one or more attributes is one or more first attributes, and the computer program code instructions are configured to, when executed, cause the apparatus to, responsive to rejecting the first subset: query the plurality of geospatial aerial images for a second subset within the bounding zone; determine one or more second attributes of the second subset, wherein the one or more second attributes is the resolution of each of the second subset, the amount of area within the bounding zone covered by the second subset, the clarity of each of the second subset, the amount of gap or overlap between the second subset, or the combination thereof; accept or reject the second subset for the image processing based on the one or more second attributes.

In various embodiments, to determine the one or more attributes and to accept or reject the subset, the computer program code instructions are configured to, when executed, cause the apparatus to, responsive to the one or more attributes being the resolution of each of the subset: for each of the subset: determine a resolution score, wherein the resolution score is a ratio of each of the subset and a total area of the bounding zone; and compare the resolution score to a first non-zero threshold; responsive to the resolution score for each of the subset being less than the first non-zero threshold, increase an image score, wherein the image score is variable based on the one or more attributes; responsive to the image score being equal to or greater than a second non-zero threshold, accept the subset; responsive to the image score being less than the second non-zero threshold, reject the subset; and responsive to the resolution score for at least one of the subset being greater than or equal to the first non-zero threshold, reject the subset.

In various embodiments, to determine the one or more attributes and to accept or reject the subset, the computer program code instructions are configured to, when executed, cause the apparatus to, responsive to the one or more attributes being the amount of area within the bounding zone covered by the subset: determine a coverage score for the subset, wherein the coverage score is a ratio of a sum of all areas of the subset within the bounding zone and an area of the bounding zone; compare the coverage score to a first non-zero threshold; responsive to the coverage score being equal to or greater than the first non-zero threshold, increase an image score, wherein the image score is variable based on the one or more attributes; responsive to the image score being equal to or greater than a second non-zero threshold, accept the subset; responsive to the image score being less than the second non-zero threshold, reject the subset; and responsive to the coverage score being less than the first non-zero threshold, reject the subset.

In various embodiments, to determine the one or more attributes and to accept or reject the subset, the computer program code instructions are configured to, when executed, cause the apparatus to, responsive to the one or more attributes being the clarity of each of the subset: for each of the subset: determine a weather condition in which each of the subset was acquired; and determine light attributes associated with each of the subset; responsive to the weather conditions and the light attributes of all of the subset being consistent, increase an image score, wherein the image score is variable based on the one or more attributes; responsive to the weather conditions and the light attributes of all of the subset being inconsistent, provide no change to the image score; responsive to the image score being equal to or greater than a non-zero threshold, accept the subset; and responsive to the image score being less than the non-zero threshold, reject the subset.

In various embodiments, to determine the one or more attributes and to accept or reject the subset, the computer program code instructions are configured to, when executed, cause the apparatus to, responsive to the one or more attributes being the amount of gap or overlap between the subset: compare the subset with each other; responsive to the subset excluding any gap or overlap, increase an image score by a first amount, wherein the image score is variable based on the one or more attributes; responsive to the subset including at least one gap or overlap, determine the amount of gap or overlap between the subset; responsive to the amount of gap or overlap being less than a resolution of each of the subset, increase the image score by a second lesser amount; responsive to the amount of gap or overlap being greater than or equal to the resolution, provide no change to the image score; responsive to the image score being equal to or greater than a non-zero threshold, accept the subset; and responsive to the image score being less than the non-zero threshold, reject the subset.

According to one aspect, a non-transitory computer-readable storage medium having computer program code instructions stored therein is described. The computer program code instructions, when executed by at least one processor, cause the at least one processor to: receive a plurality of geospatial aerial images, wherein each of the plurality of geospatial aerial image data represents a zone within a map; receive a selection of a bounding zone within the map for image processing; and responsive to the bounding zone including a subset of the plurality of geospatial aerial images: determine one or more attributes of the subset, wherein the one or more attributes is a resolution of each of the subset, an amount of area within the bounding zone covered by the subset, a clarity of each of the subset, an amount of gap or overlap between the subset, or a combination thereof; and accept or reject the subset for the image processing based on the one or more attributes.

According to one aspect, a method of assessing a plurality of geospatial aerial images for image processing. The method includes: receiving the plurality of geospatial aerial images, wherein each of the plurality of geospatial aerial image data represents a zone within a map; receiving a selection of a bounding zone within the map for the image processing; and responsive to the bounding zone including a subset of the plurality of geospatial aerial images: determining one or more attributes of the subset, wherein the one or more attributes is a resolution of each of the subset, an amount of area within the bounding zone covered by the subset, a clarity of each of the subset, an amount of gap or overlap between the subset, or a combination thereof; and accepting or rejecting the subset for the image processing based on the one or more attributes.

Also, a computer program product may be provided. For example, a computer program product comprising instructions which, when the program is executed by a computer, cause the computer to carry out the steps described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings:

FIG. 7 illustrates a diagram of exemplary components of a mobile terminal for communications, which is capable of operating in the system of FIG. 1.

DETAILED DESCRIPTION

As discussed above, map-based platforms often rely on third party geospatial aerial images for providing map-based applications, such as providing a satellite imagery of a region within a map or extracting road attributes, such as poles, barriers, lane marking, etc. Since third party geospatial aerial image data often include varying attributes, executing image processing on such image data may cause a system failure on an entity (e.g., a processor, a computer, or a computing system) that is performing the image processing, thereby wasting computing resources (e.g., memory resources, processing resources, and power resources) and degrading the operational quality of the entity. To remedy such issue, an example system, apparatus, and methods are provided for assessing geospatial aerial images for image processing. In one example, the apparatus receives a plurality of geospatial aerial images, where each of the plurality of geospatial aerial image data represents a zone within a map. The apparatus selects a bounding zone within the map for image processing and, in response to the bounding zone including a subset of the plurality of geospatial aerial images, the apparatus accepts or rejects the subset for the image processing based on one or more attributes of the subset. The one or more attributes is a resolution of each of the subset, an amount of area within the bounding zone covered by the subset, a clarity of each of the subset, an amount of gap or overlap between the subset, or a combination thereof. Details of such system, apparatus, and methods will be described herein.

Figure 1:
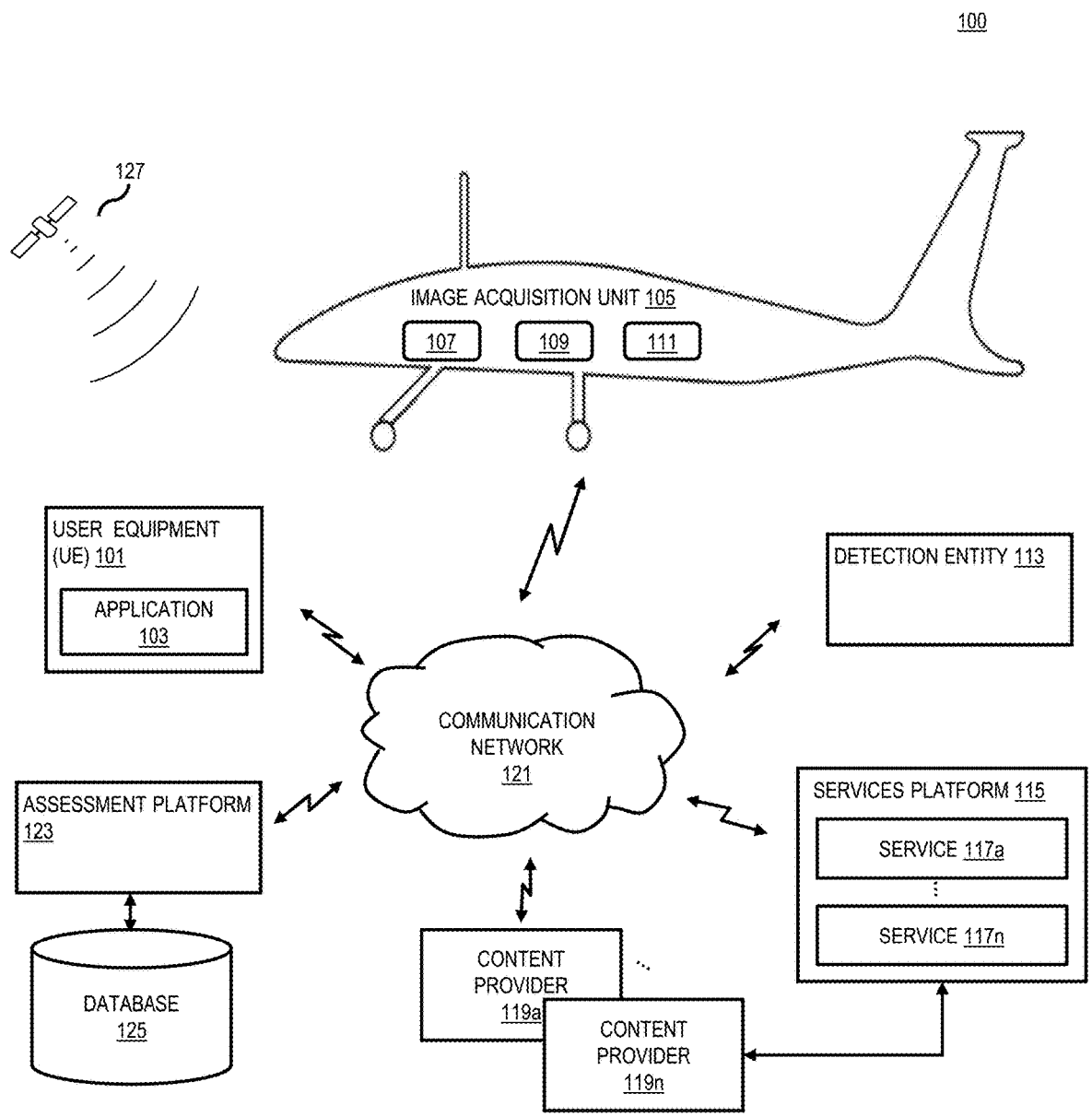
FIG. 1 illustrates a diagram of a system capable of assessing geospatial aerial images for image processing.

FIG. 1 is a diagram of a system 100 capable of assessing geospatial aerial images for image processing, according to one embodiment. The system includes a user equipment (UE) 101, an image acquisition unit 105, a detection entity 113, a services platform 115, content providers 119a-119n, a communication network 121, an assessment platform 123, a database 125, and a satellite 127. Additional or a plurality of mentioned components may be provided. acquisition In the illustrated embodiment, the system 100 comprises a user equipment (UE) 101 that may include or be associated with an application 103. In one embodiment, the UE 101 has connectivity to the assessment platform 123 via the communication network 121. The assessment platform 123 performs one or more functions associated with assessing geospatial aerial images for image processing. In the illustrated embodiment, the UE 101 may be any type of mobile terminal or fixed terminal such as a mobile handset, station, unit, device, multimedia computer, multimedia tablet, Internet node, communicator, desktop computer, laptop computer, notebook computer, remote controller, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with a vehicle (e.g., as part of an infotainment system of the vehicle), or any combination thereof, including the accessories and peripherals of these devices. In one embodiment, the UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 101 can be a cellular telephone. A user may use the UE 101 for navigation functions, for example, road link map updates. It should be appreciated that the UE 101 can support any type of interface to the user (such as "wearable" devices, etc.).

In the illustrated embodiment, the application 103 may be any type of application that is executable by the UE 101, such as a mapping application, a location-based service application, a navigation application, a content provisioning service, a camera/imaging application, a media player application, a social networking application, a calendar application, or any combination thereof. In one embodiment, one of the applications 103 at the UE 101 may act as a client for the assessment platform 123 and perform one or more functions associated with the functions of the assessment platform 123 by interacting with the assessment platform 123 over the communication network 121.

The image acquisition unit 105 is an aerial vehicle equipped with image sensors for acquiring geospatial aerial images. By way of example, the image acquisition unit 105 may be a manned aircraft, an unmanned aircraft, or a manned aircraft including a degree of autonomy for maneuvering the aircraft. The image acquisition unit 105 includes sensors 107, an on-board communication platform 109, and an on-board computing platform 111. The sensors 107 may include image sensors (e.g., electronic imaging devices of both analog and digital types, which include digital cameras, camera modules, camera phones, thermal imaging devices, radar, sonar, lidar, etc.). The image sensors may be equipped on the image acquisition unit 105 such that the sensors face towards the ground when the image acquisition unit 105 is in flight. The sensors 107 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the pitch, roll, yaw angles of the image acquisition unit 105 along a path of travel, etc. In one embodiment, the image acquisition unit 105 may include GPS receivers to obtain geographic coordinates from satellites 127 for determining current location and time associated with the image acquisition unit 105. Further, the location can be determined by a triangulation system such as A-GPS, Cell of Origin, or other location extrapolation technologies.

The on-board communications platform 109 includes wired or wireless network interfaces to enable communication with external networks. The on-board communications platform 109 also includes hardware (e.g., processors, memory, storage, antenna, etc.) and software to control the wired or wireless network interfaces. In the illustrated example, the on-board communications platform 109 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11 ad), etc.). In some examples, the on-board communications platform 109 includes a wired or wireless interface (e.g., an auxiliary port, a Universal Serial Bus (USB) port, a Bluetooth® wireless node, etc.) to communicatively couple with the UE 101.

The on-board computing platform 111 performs one or more functions associated with the image acquisition unit 105. In one embodiment, the on-board computing platform 109 may aggregate sensor data generated by at least one of the sensors 107 and transmit the sensor data via the on-board communications platform 109. The on-board computing platform 109 may receive control signals for performing one or more of the functions from the assessment platform 123, the UE 101, the services platform 115, one or more of the content providers 119a-119n, or a combination thereof via the on-board communication platform 111. The on-board computing platform 111 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The detection entity 113 may be a vehicle, a drone, an aerial vehicle, a user equipment, a road-side sensor, or a device mounted on a stationary object within or proximate to a road segment (e.g., a traffic light post, a sign post, a post, a building, etc.). The detection entity 113 includes one or more image sensors such as electronic imaging devices of both analog and digital types, which include digital cameras, camera modules, camera phones, thermal imaging devices, radar, sonar, lidar, etc. The detection entity 113 may further include a network detection sensor for detecting wireless signals or receivers for different short-range communications (e.g., Bluetooth, Wi-Fi, Li-Fi, near field communication (NFC), etc.), temporal information sensors, an audio recorder for gathering audio data, velocity sensors, light sensors, oriental sensors augmented with height sensor and acceleration sensor, tilt sensors to detect the degree of incline or decline of the detection entity 113 along a path of travel, etc. In a further embodiment, sensors about the perimeter of the detection entity 113 may detect the relative distance of the detection entity 113 from road objects, lanes, or roadways, the presence of other vehicles, pedestrians, traffic lights, road features (e.g., curves) and any other objects, or a combination thereof. Said sensors may also detect orientations of such objects. In one embodiment, the detection entity 113 may include GPS receivers to obtain geographic coordinates from satellites 127 for determining current location and time associated with the detection entity 113. Further, the location can be determined by a triangulation system such as A-GPS, Cell of Origin, or other location extrapolation technologies. The detection entity 113 may further include a receiver and a transmitter for maintaining communication with the assessment platform 123 and/or other components within the system 100.

The services platform 115 may provide one or more services 117a-117n (collectively referred to as services 117), such as mapping services, navigation services, travel planning services, weather-based services, emergency-based services, notification services, social networking services, content (e.g., audio, video, images, etc.) provisioning services, application services, storage services, contextual information determination services, location-based services, information-based services, etc. In one embodiment, the services platform 115 may be an original equipment manufacturer (OEM) platform. In one embodiment the one or more service 117 may be sensor data collection services. By way of example, vehicle sensor data provided by the sensors 107 may be transferred to the UE 101, the assessment platform 123, the database 125, or other entities communicatively coupled to the communication network 121 through the service platform 115. In one embodiment, the services platform 115 uses the output data generated by of the assessment platform 123 to provide services such as navigation, mapping, other location-based services, etc.

In one embodiment, the content providers 119a-119n (collectively referred to as content providers 119) may provide content or data (e.g., including geographic data, parametric representations of mapped features, etc.) to the UE 101, the image acquisition unit 105, services platform 115, the image acquisition unit 105, the database 125, the assessment platform 123, or the combination thereof. In one embodiment, the content provided may be any type of content, such as map content, textual content, audio content, video content, image content, etc. In one embodiment, the content providers 119 may provide content that may aid in assessing geospatial aerial images for image processing, and/or other related characteristics. In one embodiment, the content providers 119 may also store content associated with the UE 101, the image acquisition unit 105, services platform 115, the assessment platform 123, the database 125, or the combination thereof. In another embodiment, the content providers 119 may manage access to a central repository of data, and offer a consistent, standard interface to data, such as a repository of the database 125.

The communication network 121 of system 100 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the assessment platform 123 may be a platform with multiple interconnected components. The assessment platform 123 may include multiple servers, intelligent networking devices, computing devices, components and corresponding software for assessing geospatial aerial images for image processing. It should be appreciated that that the assessment platform 123 may be a separate entity of the system 100, included within the UE 101 (e.g., as part of the applications 103), included within the image acquisition unit 105 (e.g., as part of an application stored in the memory of the on-board computing platform 111), included within the services platform 115 (e.g., as part of an application stored in server memory for the services platform 115), included within the content providers 119 (e.g., as part of an application stored in sever memory for the content providers 119), other platforms embodying a power supplier (not illustrated), or a combination thereof.

The assessment platform 123 is capable of: (1) acquiring a plurality of geospatial aerial images from various sources, such as the image acquisition unit 105, services platform 115, content providers 119, database 125, other data sources, or a combination thereof; (2) receiving selection of a bounding zone within the map for image processing (where the selection is determined by a user via the UE 101 or is automatically determined); and (3) if the bounding zone includes a subset of the plurality of geospatial aerial images, accepting or rejecting the subset for the image processing based on one or more attributes of the subset. A bounding zone may be a zone in which the assessment platform 123 performs the image processing for providing a map-based application. The bounding zone may be selected as a region within a map and may include one or more of the plurality of geospatial aerial images. Herein, one or more geospatial aerial images included within the bounding zone will be referred as a subset. Each of the plurality of geospatial aerial images may indicate a region within a map and may be characterized by one or more attributes. Such attributes may be: (1) a shape of the region depicted by said geospatial aerial image; (2) dimensions of the region depicted by said geospatial aerial image; (3) a resolution of said geospatial aerial image; (4) temporal information including a timestamp, date, month, and/or year in which said geospatial aerial image was acquired; (5) light attributes of the region during the timestamp; (6) one or more weather conditions of the region during the timestamp; (7) other relevant information; or (8) a combination thereof. In one embodiment, the attributes of geospatial aerial images may be acquired by the image acquisition unit 105, one or more detection entities 113, or a combination thereof. For example, the image acquisition unit 105 may determine a shape of a region indicated by a geospatial aerial image, dimensions of the region indicated by the geospatial aerial image, the resolution of the geospatial aerial image, and the timestamp of the geospatial aerial image, and the one or more detection entities 113 within the region may acquire light attributes and one or more weather conditions of the region during the timestamp.

In one embodiment, to accept or reject a subset for image processing, the assessment platform 123 determines an image score of the subset. The image score is derived as a function of subscores, where the subscores include: (1) a resolution score of each geospatial aerial image within the subset; (2) a coverage score of the subset; (3) a clarity score of the subset; and (4) a gap or overlap score of the subset.

The resolution score is derived for each geospatial aerial image within the subset. The resolution score is calculated as a ratio of a resolution of a geospatial aerial image within the subset and a total area of the bounding zone. Herein, a resolution of an image is a distance between two pixels within the image. The resolution score is compared against a resolution score threshold, and if the resolution score of each geospatial aerial image within the subset is less than or equal to the resolution score threshold, the resolution score is used for calculating the image score. In one embodiment, if the resolution score of at least one geospatial aerial image within the subset is greater than the resolution score threshold, the resolution score is not used for calculating the image score. In an alternative embodiment, if the resolution score of at least one geospatial aerial image is greater than the resolution score threshold, the image score is not further calculated, and the entire subset is rejected for image processing. The resolution score threshold is set such that road attributes, such as poles, barriers, lane markings, etc., can be readily discerned from geospatial aerial images when image processing is performed on said images. By way of example, if the minimum resolutions for extracting poles, barriers, lane markings, and physical dividers from geospatial aerial images are 3 cm, 10 cm, 1 cm, and 10 cm, respectively, and the total area of the bounding zone is 1000 cm squared, the resolution score threshold may be 0.001 such that lane markings can be discernible from geospatial aerial images when image processing is perform on said images.

The coverage score is calculated as a function of an amount of area within the bounding zone covered by the subset and the bounding zone. In one embodiment, the coverage score may be calculated based on a following equation:

$$C = \frac{\sum_{i=1}^{i=n} l_i * b_i}{A}$$ [Equation 1]

In Equation 1, C is the coverage score, A is the total area of the bounding zone, n is the number of geospatial aerial images within the bounding zone, $l_i$ is the length of the i-th geospatial aerial image, and $b_i$ is the breadth of the i-th geospatial aerial image. In such embodiment, it is assumed that the shape of a geospatial aerial image is a rectangle. For embodiments in which the shape of a geospatial aerial image within the subset is irregular, the coverage score is calculated as a ratio of a sum of all areas of geospatial aerial images within the subset and the area of the bounding zone, where each of the areas of the geospatial aerial images is calculated based on known area equations (e.g., partitioning an irregular shape into common shapes, calculating the area of each common shape, calculating the sum of all areas of the common shapes, etc.). It is contemplated that geospatial aerial images within a subset may be overlapping. As such, in certain embodiments, the total amount of area(s) within the bounding zone covered by the subset is determined (i.e., excluding all areas in which geospatial aerial images are overlapping), and the coverage score is defined by a ratio of said amount and the area of the bounding zone. The coverage score is compared against a coverage score threshold. By way of example, the coverage score threshold may be any value from 0.8 to a value greater than 0.8 but less than 1. In one embodiment, if the coverage score is less than the coverage score threshold, the coverage score is not used for calculating the image score. In an alternative embodiment, if the coverage score is less than the coverage score threshold, the image score is not further calculated, and the entire subset is rejected for image processing.

The clarity score is determined based on a degree of consistency in clarity among the subset. Specifically, the degree of consistency in clarity may be derived based on one or more attributes of each geospatial aerial image of the subset. In one embodiment, said attribute may be light attributes associated with the region of said geospatial aerial image. The light attributes associated with the region correspond to the timestamp in which said geospatial aerial image was captured. The light attributes may indicate a light contrast level, a light intensity level, and/or an angle of lights beams impacting the region of said geospatial aerial image. The degree of consistency between the subset may be significant if each of the subset were captured within a short amount of period (e.g., within seconds, minutes, or few hours) of if each of the subset were captured within the same or similar time of different days. For example, a clarity of two geospatial aerial images captured during daytime may have a "high" level of consistency (i.e., consistent), whereas a clarity of one geospatial aerial image captured during daytime and another geospatial aerial image captured during night-time may have a "low" level of consistency (i.e., inconsistent). If the light attributes of all geospatial aerial images of the subset are consistent to each other, a Boolean value of one is assigned, and said value is used for calculating the image score. However, if the light attributes of at least one of the geospatial aerial images of the subset is inconsistent, a Boolean value of zero is assigned, and said value is used for calculating the image score. In one embodiment, said attribute may be one or more weather conditions associated with the region of said geospatial aerial image. The weather conditions associated with the region correspond to the timestamp in which said geospatial aerial image was captured. The weather conditions may be rain, snow, fog, cloudiness, etc. If the weather conditions of all geospatial aerial images of the subset are consistent to each other (e.g., the weather conditions are all snowy conditions, all clear daytime conditions, all clear night-time condition, all rainy conditions, etc.), a Boolean value of one is assigned, and said value is used for calculating the image score. However, if the weather condition of at least one of the geospatial aerial images is inconsistent, a Boolean value of zero is assigned. In one embodiment, a Boolean value of one is assigned if the light attributes and the weather conditions of all geospatial aerial images within the subset are consistent, and a Boolean value of zero is assigned if at least one of the light attributes or the weather conditions of the subset is inconsistent. In one embodiment, if the clarity score indicates a "low" level of consistency (e.g., Boolean value of zero), the entire subset is rejected for image processing. In one embodiment, information indicating light attributes and weather conditions of regions may be acquired by one or more detection entities 113 that were within the regions during periods in which geospatial aerial images were acquired. In alternative embodiments, such information may be provided by the services platform 115, content providers 119, or other entities.

The gap or overlap score is assigned based on a degree of gap or overlap between the subset. In one embodiment, if all the geospatial aerial images within the subset are a perfect fit (i.e., there is no gap or overlap between images), a first value is assigned for the gap or overlap score. However, if there is a gap or an overlap between at least two geospatial aerial images, where said gap or said overlap is less than a predetermined resolution, a second lesser value is assigned for the gap or overlap score. The predetermined resolution may be: (1) the resolution of each of the at least two geospatial aerial images; (2) the resolution of one of the at least two geospatial aerial images having the least amount of resolution; or (3) the resolution of one of the subset having the least amount of resolution. If said gap or said overlap is equal to or greater than the predetermined resolution, a third lesser value is applied for the gap or overlap score. By way of example, the first value may be 1.0, the second value may be 0.75, and the third value may be 0. If said gap or said overlap is equal to or greater than the resolution of each of the at least two geospatial aerial images, a third lesser value is applied for the gap or overlap score. It is contemplated that the value of the gap or overlap score may increase or decrease based on a degree of gap or overlap between the subset. For example, as the amount of gap or overlap between two geospatial aerial images increase, the gap or overlap score decreases, and as the amount of gap or overlap between said geospatial aerial images decrease, the gap or overlap score increases. In one embodiment, if the gap or overlap score indicates the third value, the entire subset is rejected for image processing.

The image score is calculated based on the following equation:

$$IS = \frac{\sum w_i * s_i}{\sum w_i} \quad \text{[Equation 2]}$$

In Equation 2, IS is the image score, $w_i$ is the weight of each of the subscores, and $s_i$ is each of the subscores. The weight is established such that the sum of all the weights of the subscores is equal to 1. In one embodiment, each of the subscores is equal to each other. In another embodiment, weights of the resolution score and the coverage score are greater than the clarity score and the gap or overlap score. Once the image score is determined, the assessment platform 123 compares the image score to an image score threshold. The image score threshold may be a non-zero threshold value, where the value is greater than 0 but less than 1. By way of example, the image score threshold may be 0.5. As such, if the image score is equal to or greater than the image score threshold, the subset is used for image processing, and if the image score is less than the image score threshold, the subset is rejected for image processing.

Figure 2:
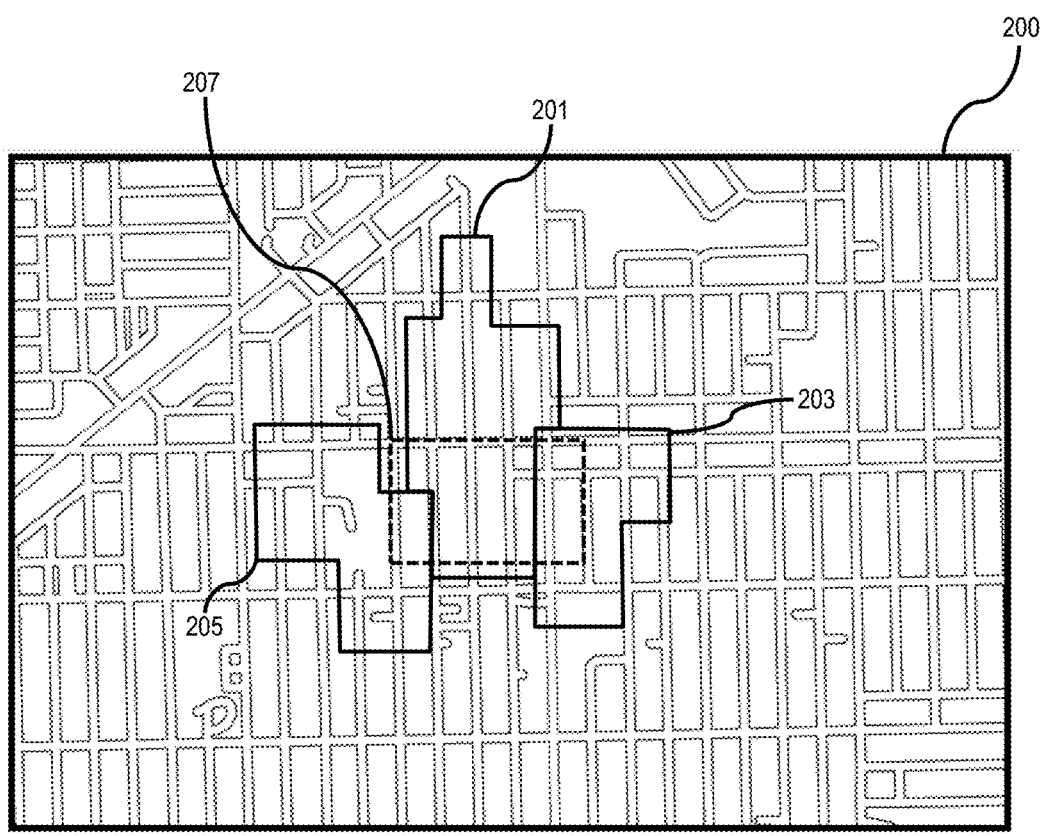
FIG. 2 illustrates an example map including a plurality of geospatial aerial images and a bounding zone.

FIG. 2 illustrates an example map 200 including a plurality of geospatial aerial images 201, 203, and 205 and a bounding zone 207. In the illustrated example, a first geospatial aerial image 201 covers one region within the map 200, a second geospatial aerial image 203 covers a second region within the map 200, and a third geospatial aerial image 205 covers a third region within the map 200. In the illustrated example, the bounding zone 207 has a shape of a rectangle and includes portions of the first geospatial aerial image 201, the second geospatial aerial image 203, and third geospatial aerial image 205. The entirety of the bounding zone 207 is not covered by the first geospatial aerial image 201, the second geospatial aerial image 203, and the third geospatial aerial image 205. As such, the coverage score of the bounding zone 207 and the image score of the bounding zone 207 are lowered.

The assessment platform 123 passes a subset having an image score that satisfies the image score threshold for image processing. By way of example, image processing may be performed on the subset for generating a map layer or a map-based feature of a map-based application (e.g., providing satellite imagery). In one embodiment, image processing may be performed on the subset for extracting road attributes within road segments/nodes, such as poles, barriers, road signs, lane markings, etc. The extracted attributes may be defined within one or more map layers, and said map layers may be used for providing navigational applications, such as providing localization for autonomous vehicles. In one embodiment, the assessment platform 123 directly performs the image processing on the subset that satisfies the image score threshold or passes the subset to other entities for executing the image processing (e.g., the services platform 115, content providers 119, or other data processing entities).

The assessment platform 123 can be implemented in hardware, firmware, software, or a combination thereof. Though depicted as a separate entity in FIG. 1, it is contemplated that the assessment platform 123 may be implemented for direct operation by the UE 101, the image acquisition unit 105, the services platform 115, one or more of the content providers 119, or a combination thereof. As such, the assessment platform 123 may generate direct signal inputs by way of the operating system of the UE 101, the image acquisition unit 105, the services platform 115, the one or more of the content providers 119, or the combination thereof for interacting with the applications 103. The various executions presented herein contemplate any and all arrangements and models.

In the illustrated embodiment, the database 125 stores information on road links (e.g., road length, road breadth, slope information, curvature information, geographic attributes, etc.), probe data for one or more road links (e.g., traffic density information), POIs, and other types map-related features. In one embodiment, the database 125 may include any multiple types of information that can provide means for aiding in assessing geospatial aerial images for image processing. It should be appreciated that the information stored in the database 125 may be acquired from any of the elements within the system 100, other vehicles, sensors, database, or a combination thereof.

In one embodiment, the UE 101, the image acquisition unit 105, the detection entity 113, the services platform 115, the content providers 119, the assessment platform 123 communicate with each other and other components of the communication network 121 using well known, new or still developing protocols. In this context, a protocol includes a set of rules defining how the network nodes within the communication network 121 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 3:
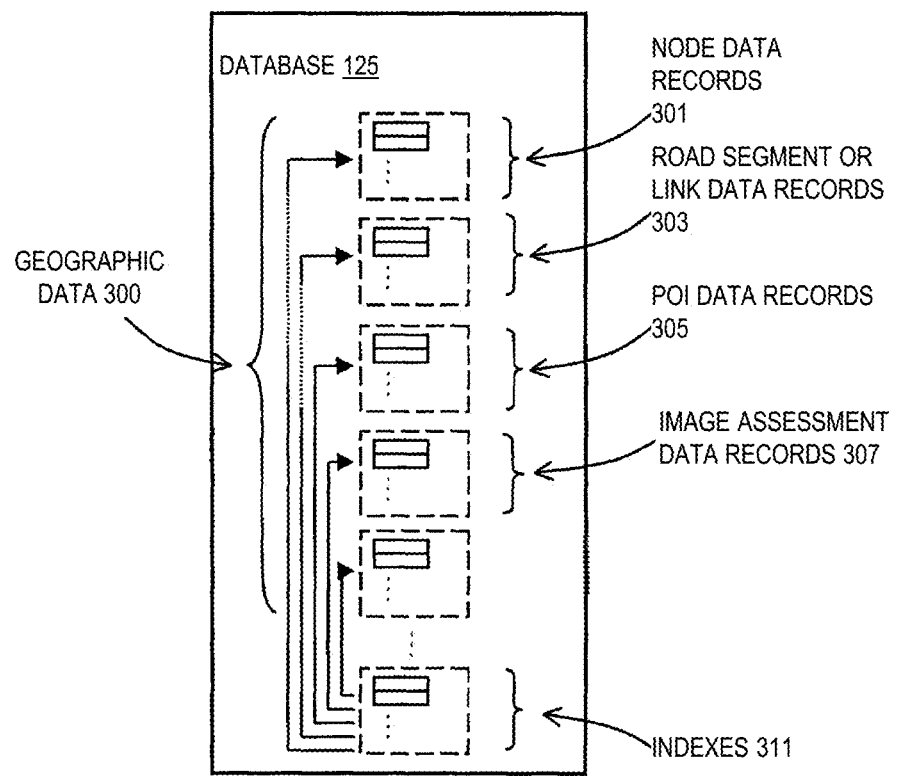
FIG. 3 illustrates a diagram of a database of FIG. 1.

FIG. 3 is a diagram of a database 125 (e.g., a map database), according to one embodiment. In one embodiment, the database 125 includes data 300 used for (or configured to be compiled to be used for) mapping and/or navigation-related services, such as for personalized route determination, according to exemplary embodiments.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the database 125.

"Node"—A point that terminates a link.

"Line segment"—A line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island).

In one embodiment, a polygon is constructed from one outer simple polygon and none or at least one inner simple polygon. A polygon is simple if it just consists of one simple polygon, or complex if it has at least one inner simple polygon.

In one embodiment, the database 125 follows certain conventions. For example, links do not cross themselves and do not cross each other except at a node or vertex. Also, there are no duplicated shape points, nodes, or links. Two links that connect each other have a common node or vertex. In the database 125, overlapping geographic features are represented by overlapping polygons. When polygons overlap, the boundary of one polygon crosses the boundary of the other polygon. In the database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the database 125 is presented according to a hierarchical or multilevel tile projection. More specifically, in one embodiment, the database 125 may be defined according to a normalized Mercator projection. Other projections may be used. In one embodiment, a map tile grid of a Mercator or similar projection can a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has $2(n+1)$ cells. Accordingly, any tile of the level (n) has a geographic area of $A/2(n+1)$ where A is the total geographic area of the world or the total area of the map tile grids. Because of the numbering system, the exact position of any tile in any level of the map tile grid or projection may be uniquely determined from the tile ID.

As shown, the database 125 includes node data records 301, road segment or link data records 303, POI data records 305, image assessment data records 307, other records 309, and indexes 311, for example. More, fewer or different data records can be provided. In one embodiment, additional data records (not shown) can include cartographic ("carto") data records, routing data, and maneuver data. In one embodiment, the indexes 311 may improve the speed of data retrieval operations in the database 125. In one embodiment, the indexes 311 may be used to quickly locate data without having to search every row in the database 125 every time it is accessed.

In exemplary embodiments, the road segment data records 303 are links or segments representing roads, streets, or paths, as can be used in the calculated route or recorded route information for determination of one or more personalized routes. The node data records 301 are end points (such as intersections) corresponding to the respective links or segments of the road segment data records 303. The road link data records 303 and the node data records 301 represent a road network, such as used by vehicles, cars, and/or other entities. Alternatively, the database 125 can contain path segment and node data records or other data that represent pedestrian paths or areas in addition to or instead of the vehicle road record data, for example. In one embodiment, the road or path segments can include an altitude component to extend to paths or road into three-dimensional space (e.g., to cover changes in altitude and contours of different map features, and/or to cover paths traversing a three-dimensional airspace).

Links, segments, and nodes can be associated with attributes, such as geographic coordinates, a number of road objects (e.g., road markings, road signs, traffic light posts, etc.), types of road objects, traffic directions for one or more portions of the links, segments, and nodes, traffic history associated with the links, segments, and nodes, street names, address ranges, speed limits, turn restrictions at intersections, presence of roadworks, and other navigation related attributes, as well as POIs, such as gasoline stations, hotels, restaurants, museums, stadiums, offices, automobile dealerships, auto repair shops, factories, buildings, stores, parks, etc. The database 125 can include data about the POIs and their respective locations in the POI data records 205. The database 125 can also include data about places, such as cities, towns, or other communities, and other geographic features, such as bodies of water, mountain ranges, etc. Such place or feature data can be part of the POI data records 305 or can be associated with POIs or POI data records 305 (such as a data point used for displaying or representing a position of a city).

The image assessment data records 307 include an algorithm for rating a subset of geospatial aerial images within a bounding zone. The algorithm derives: (1) the resolution score, where the resolution score is a ratio of a resolution of a geospatial aerial image within the subset and a total area of the bounding zone; (2) the coverage score, where the coverage score is a ratio of a sum of all the areas of the geospatial aerial images within the subset and the area of the bounding zone; (3) the clarity score, where the clarity score is determined based on a degree consistency in clarity between geospatial aerial images within the subset; (4) and the gap or overlap score, where the gap or overlap score is determined based on a degree of gap or overlap between geospatial aerial images within the subset. The algorithm calculates the image score based on the resolution score, the coverage score, the clarity score, and the gap or overlap score, and if the image score satisfies the image score threshold, the subset is passed to image processing for providing map-based applications.

In one embodiment, the database 125 can be maintained by the services platform 115 and/or one or more of the content providers 119 in association with a map developer. The map developer can collect geographic data to generate and enhance the database 125. There can be different ways used by the map developer to collect data. These ways can include obtaining data from other sources, such as municipalities or respective geographic authorities. In addition, the map developer can employ field personnel to travel by vehicle along roads throughout the geographic region to observe attributes associated with one or more road segments and/or record information about them, for example. Also, remote sensing, such as aerial or satellite photography, can be used.

The database 125 can be a master database stored in a format that facilitates updating, maintenance, and development. For example, the master database or data in the master database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the image acquisition unit 105, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for assessing geospatial aerial images for image processing may be advantageously implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof.

Figure 4:
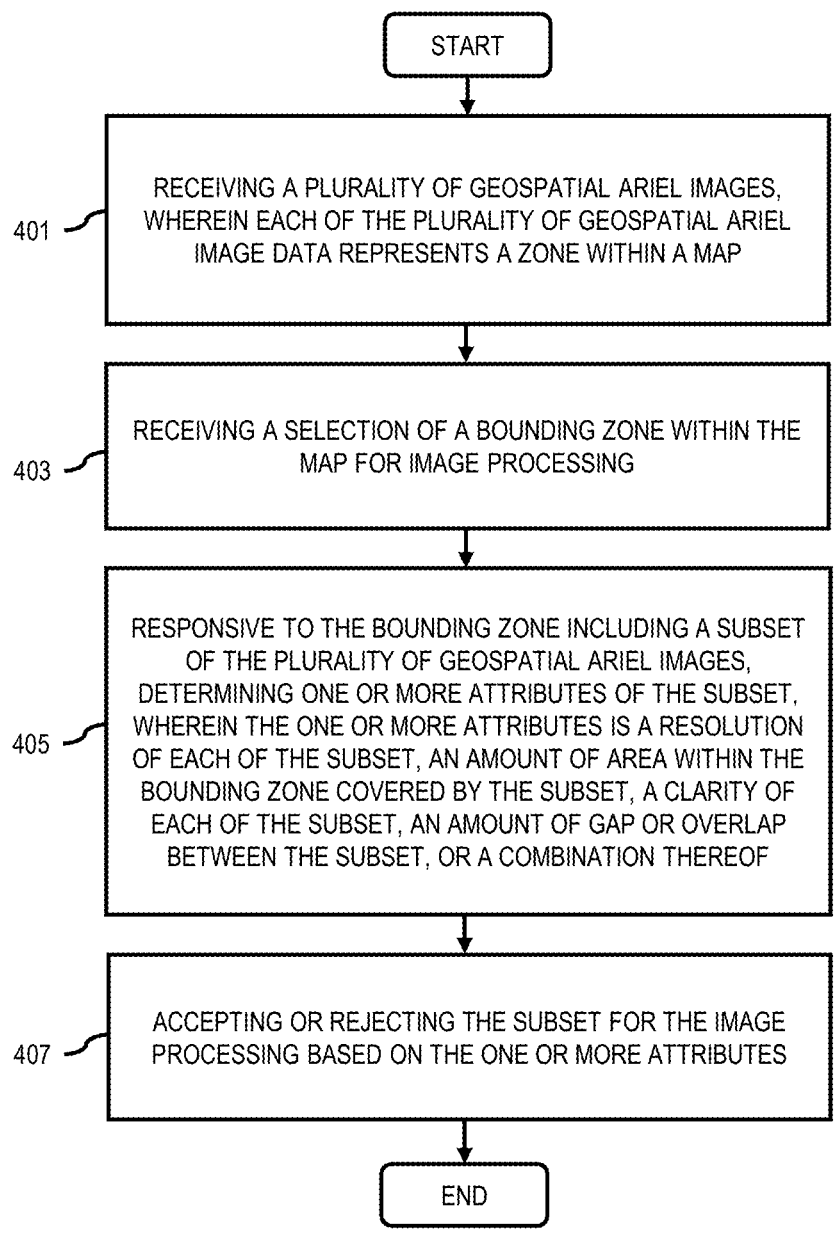
FIG. 4 illustrates a flowchart of a process for assessing a plurality of geospatial aerial images for image processing.
Figure 6:
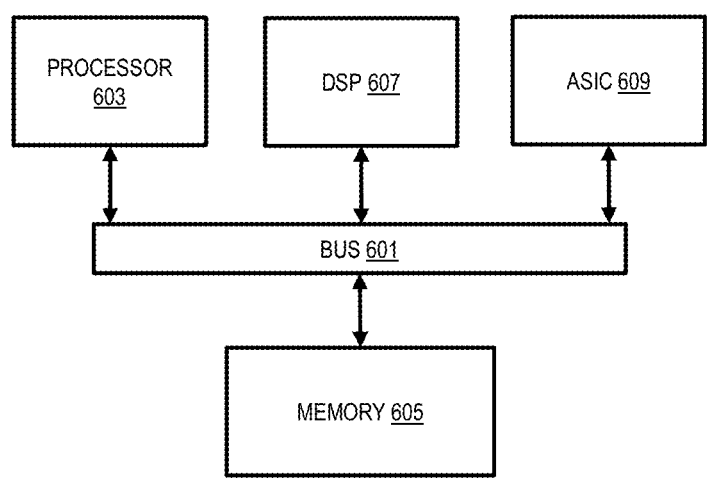
FIG. 6 illustrates a chip set or chip upon which an embodiment may be implemented.

FIG. 4 is a flowchart of a process 400 for assessing a plurality of geospatial aerial images for image processing, according to one embodiment. In one embodiment, the assessment platform 123 performs the process 400 and is implemented in, for instance, a chip set including a processor and a memory as shown in FIG. 6.

In step 401, the assessment platform 123 receives a plurality of geospatial aerial images, where each of the plurality of geospatial aerial image data represents a zone within a map. In one embodiment, the assessment platform 123 may receive said images from various sources, such as the image acquisition unit 105, the services platform 115, the content providers 119, the database 125, other data sources, or a combination thereof. The plurality of geospatial aerial images may be provided from different databases. Therefore, there exists a likelihood in which attributes of the plurality of geospatial aerial images are different each other.

In step 403, the assessment platform 123 receives a selection of a bounding zone within the map for image processing. A bounding zone may be a zone in which the assessment platform 123 performs the image processing for providing a map-based application. The bounding zone may be selected as a region within a map and may include one or more of the plurality of geospatial aerial images. The bounding zone may be selected by a user or defined automatically by a computer executable program.

In step 405, if the bounding zone includes a subset of the plurality of geospatial aerial images, the assessment platform 123 determines one or more attributes of the subset. The one or more attributes is a resolution of each of the subset, an amount of area within the bounding zone covered by the subset, a clarity of each of the subset, an amount of gap or overlap between the subset, or a combination thereof. The resolution of each geospatial aerial image of the subset may be determined by deriving a resolution score. The resolution score may be calculated as a ratio of a resolution of said geospatial aerial image and a total area of the bounding zone. The amount of area within the bound zone covered by the subset may be determined by deriving a coverage score. In one embodiment, the coverage score may be calculated as a ratio of a sum of all areas of geospatial aerial images within the subset and the area of the bounding zone. In one embodiment, the coverage score may be calculated as a ratio of a total amount of area(s) within the bounding zone covered by the subset and the area of the bounding zone. The clarity of each of the subset is determined based on a clarity score. The clarity score is determined based on a degree of consistency in clarity among the subset. The degree of consistency in clarity may be derived from one or more attributes of each geospatial aerial image of the subset. In one embodiment, said attribute may be light attributes associated with the region of said geospatial aerial image during the timestamp in which said geospatial aerial image was captured. In one embodiment, said attribute may be one or more weather conditions associated with the region of said geospatial aerial image. The weather conditions associated with the region correspond to the timestamp in which said geospatial aerial image was captured. As such, geospatial aerial images sharing similar weather conditions and light attributes have a greater degree of consistency in clarity; whereas geospatial aerial images associated with different weather conditions and light attributes have a lesser degree of consistency in clarity. The amount of gap or overlap between the subset may be determined by deriving a gap or overlap score. The gap or overlap score is assigned such that: (1) if all the geospatial aerial images within the subset are a perfect fit (i.e., there is no gap or overlap between images), a first value is assigned for the gap or overlap score; (2) if there is a gap or an overlap between at least two geospatial aerial images, where said gap or said overlap is less than a predetermined resolution, a second lesser value is assigned for the gap or overlap score; and (3) if said gap or said overlap is equal to or greater than the predetermined resolution, a third lesser value is applied for the gap or overlap score. The predetermined resolution may be: (1) the resolution of each of the at least two geospatial aerial images; (2) the resolution of one of the at least two geospatial aerial images having the least amount of resolution; or (3) the resolution of one of the subset having the least amount of resolution.

In step 407, the assessment platform 123 accepts or rejects the subset for the image processing based on the one or more attributes. In one embodiment, the assessment platform 123 may calculate an image score based on the resolution score, the coverage score, the clarity score, the gap or overlap score, or a combination thereof. In such embodiment, the image score is compared to an image score threshold, and if the image score satisfies the image score threshold, the subset is used for image processing.

The system, apparatus, and methods described herein reliably assess geospatial aerial images for image processing, thereby preventing incidences in which system failures occur within processors, computers, and/or computing systems that execute the image processing. Additionally, the system, apparatus, and methods described herein initiate the process of assessing the geospatial aerial images prior to performing the image processing, thereby eliminating steps in which image processing is repeatedly performed for each variation of geospatial aerial images within a bounding zone until an acceptable variation of geospatial aerial images is found. Since processors, computers, and computing systems that utilize or embody the system, apparatus, and methods described herein need not perform said steps of processing different variations of geospatial aerial images, computing resources can be saved and degradation of said processors, computers, and computing systems can be mitigated.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
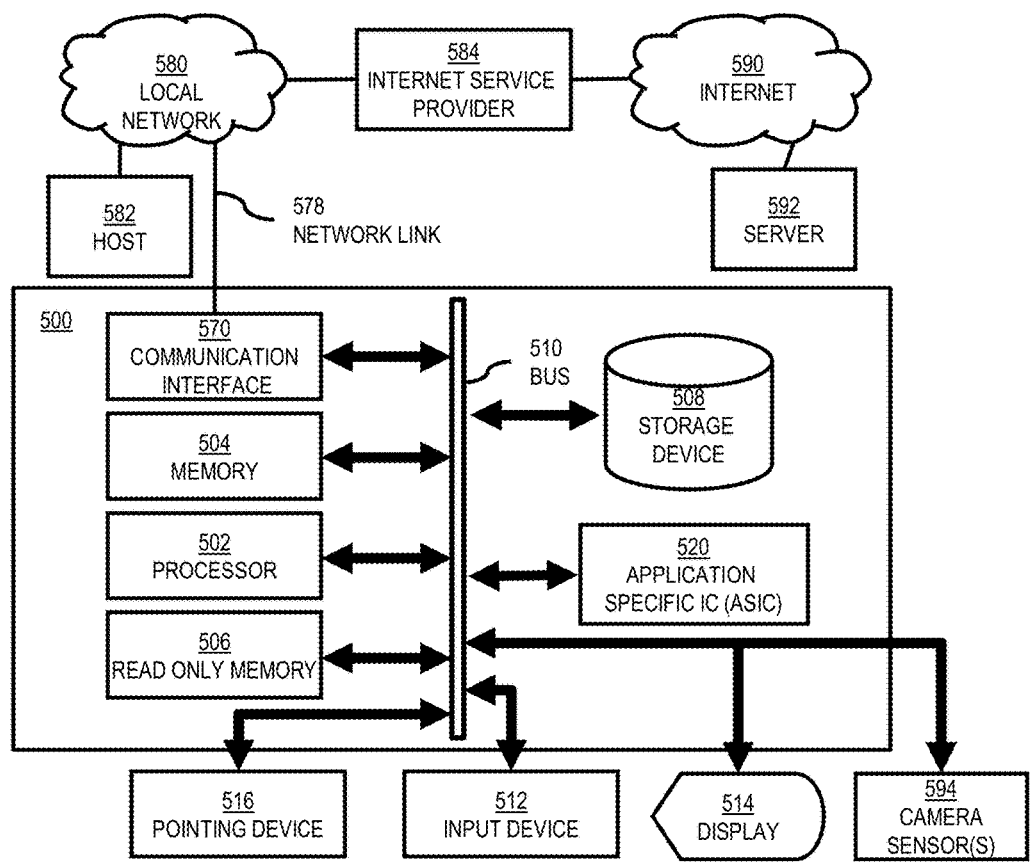
FIG. 5 illustrates a computer system upon which an embodiment may be implemented.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to assess geospatial aerial images for image processing as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of assessing geospatial aerial images for image processing.

A bus 510 includes one or more parallel conductors of information so that information is transferred quickly among devices coupled to the bus 510. One or more processors 502 for processing information is coupled with the bus 510.

A processor (or multiple processors) 502 performs a set of operations on information as specified by computer program code related to assessing geospatial aerial images for image processing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND.

Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 500 also includes a memory 504 coupled to bus 510. The memory 504, such as a random access memory (RAM) or any other dynamic storage device, stores information including processor instructions for assessing geospatial aerial images for image processing. Dynamic memory allows information stored therein to be changed by the computer system 600. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 504 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for assessing geospatial aerial images for image processing, is provided to the bus 510 for use by the processor from an external input device 512, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514, and one or more camera sensors 594 for capturing, recording and causing to store one or more still and/or moving images (e.g., videos, movies, etc.) which also may comprise audio recordings. In some embodiments, for example, in embodiments in which the computer system 500 performs all functions automatically without human input, one or more of external input device 512, display device 514 and pointing device 516 may be omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 121 for assessing geospatial aerial images for image processing to the UE 101.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 582 connected to the Internet hosts a process that provides a service in response to information received over the Internet. For example, server host 582 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 582 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

FIG. 6 illustrates a chip set or chip 600 upon which an embodiment of the invention may be implemented. Chip set 600 is programmed to assess geospatial aerial images for image processing as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of assessing geospatial aerial images for image processing.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real-time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 600 includes merely one or more processors and some software and/or firmware supporting and/or relating to and/or for the one or more processors. The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to assess geospatial aerial images for image processing. The memory 605 also stores the data associated with or generated by the execution of the inventive steps.

FIG. 7 is a diagram of exemplary components of a mobile terminal 701 (e.g., a mobile device or vehicle or part thereof) for communications, which is capable of operating in the system of FIG. 1, according to one embodiment. In some embodiments, mobile terminal 701, or a portion thereof, constitutes a means for performing one or more steps of assessing geospatial aerial images for image processing. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of assessing geospatial aerial images for image processing. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to assess geospatial aerial images for image processing. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

Further, one or more camera sensors 753 may be incorporated onto the mobile station 701 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. An apparatus comprising at least one processor and at least one non-transitory memory including computer program code instructions, the computer program code instructions configured to, when executed, cause the apparatus to:
   receive a plurality of geospatial aerial images, wherein each of the plurality of geospatial aerial image data represents a zone within a map;
   receive a selection of a bounding zone within the map for image processing; and
   responsive to the bounding zone including a subset of the plurality of geospatial aerial images:
      determine one or more attributes of the subset, wherein the one or more attributes is a resolution of each of the subset, an amount of area within the bounding zone covered by the subset, a clarity of each of the subset, an amount of gap or overlap between the subset, or a combination thereof; and
   accept or reject the subset for the image processing based on the one or more attributes, wherein, to determine the one or more attributes and to accept or reject the subset, the computer program code instructions are configured to, when executed, cause the apparatus to:
      for each of the subset:
         determine a resolution score, wherein the resolution score is a ratio of each of the subset and an area of the bounding zone; and
         compare the resolution score to a resolution score threshold;
      responsive to the resolution score for each of the subset being less than the first non-zero threshold, increase an image score, wherein the image score is variable based on the one or more attributes;
      responsive to the image score being equal to or greater than an image score threshold, accept the subset;
      responsive to the image score being less than the image score threshold, reject the subset; and
      responsive to the resolution score for at least one of the subset being greater than or equal to the resolution score threshold, reject the subset.

2. The apparatus of claim 1, wherein the computer program code instructions are configured to, when executed, cause the apparatus to, responsive to accepting the subset, perform the image processing for a map-based application.

3. The apparatus of claim 1, wherein the subset is a first subset, wherein the one or more attributes is one or more first attributes, and wherein the computer program code instructions are configured to, when executed, cause the apparatus to, responsive to rejecting the first subset:
   query the plurality of geospatial aerial images for a second subset within the bounding zone;
   determine one or more second attributes of the second subset, wherein the one or more second attributes is the resolution of each of the second subset, the amount of area within the bounding zone covered by the second subset, the clarity of each of the second subset, the amount of gap or overlap between the second subset, or the combination thereof;
   accept or reject the second subset for the image processing based on the one or more second attributes.

4. The apparatus of claim 1, wherein, to determine the one or more attributes and to accept or reject the subset, the computer program code instructions are configured to, when executed, cause the apparatus to:
   determine a coverage score for the subset, wherein the coverage score is a ratio of a sum of all areas of the subset within the bounding zone and the area of the bounding zone;
   compare the coverage score to a coverage score threshold;
   responsive to the coverage score being equal to or greater than the coverage score threshold, increase the image score;
   and
   responsive to the coverage score being less than the coverage score threshold, reject the subset.

5. The apparatus of claim 1, wherein, to determine the one or more attributes and to accept or reject the subset, the computer program code instructions are configured to, when executed, cause the apparatus to:
   for each of the subset:
      determine a weather condition in which each of the subset was acquired; and
      determine light attributes associated with each of the subset;
   responsive to the weather conditions and the light attributes of all of the subset being consistent, increase the image score; and responsive to the weather conditions and the light attributes of all of the subset being inconsistent, provide no change to the image score.

6. The apparatus of claim 1, wherein, to determine the one or more attributes and to accept or reject the subset, the computer program code instructions are configured to, when executed, cause the apparatus to:
compare the subset with each other;
responsive to the subset excluding any gap or overlap, increase the image score by a first amount;
responsive to the subset including at least one gap or overlap, determine the amount of gap or overlap between the subset;
responsive to the amount of gap or overlap being less than the resolution of each of the subset, increase the image score by a second lesser amount; and
responsive to the amount of gap or overlap being greater than or equal to the resolution, provide no change to the image score.

7. A non-transitory computer-readable storage medium having computer program code instructions stored therein, the computer program code instructions, when executed by at least one processor, cause the at least one processor to:
receive a plurality of geospatial aerial images, wherein each of the plurality of geospatial aerial image data represents a zone within a map;
receive a selection of a bounding zone within the map for image processing; and
responsive to the bounding zone including a subset of the plurality of geospatial aerial images:
determine one or more attributes of the subset, wherein the one or more attributes is a resolution of each of the subset, an amount of area within the bounding zone covered by the subset, a clarity of each of the subset, an amount of gap or overlap between the subset, or a combination thereof; and
accept or reject the subset for the image processing based on the one or more attributes,
wherein, to determine the one or more attributes and to accept or reject the subset, the computer program code instructions, when executed by the at least one processor, cause the at least one processor to:
determine a coverage score for the subset, wherein the coverage score is a ratio of a sum of all areas of the subset within the bounding zone and an area of the bounding zone;
compare the coverage score to a coverage score threshold;
responsive to the coverage score being equal to or greater than the coverage score threshold, increase an image score, wherein the image score is variable based on the one or more attributes;
responsive to the image score being equal to or greater than an image score threshold, accept the subset;
responsive to the image score being less than the image score threshold, reject the subset; and
responsive to the coverage score being less than the coverage score threshold, reject the subset.

8. The non-transitory computer-readable storage medium of claim 7, wherein the computer program code instructions, when executed by the at least one processor, cause the at least one processor to, responsive to accepting the subset, perform the image processing for a map-based application.

9. The non-transitory computer-readable storage medium of claim 7, wherein the subset is a first subset, wherein the one or more attributes is one or more first attributes, and wherein the computer program code instructions, when executed by the at least one processor, cause the at least one processor to, responsive to rejecting the first subset:
query the plurality of geospatial aerial images for a second subset within the bounding zone; and
determine one or more second attributes of the second subset, wherein the one or more second attributes is the resolution of each of the second subset, the amount of area within the bounding zone covered by the second subset, the clarity of each of the second subset, the amount of gap or overlap between the second subset, or the combination thereof
accept or reject the second subset for the image processing based on the one or more second attributes.

10. The non-transitory computer-readable storage medium of claim 7, wherein, to determine the one or more attributes and to accept or reject the subset, the computer program code instructions, when executed by the at least one processor, cause the at least one processor to:
for each of the subset:
determine a resolution score, wherein the resolution score is a ratio of each of the subset and the area of the bounding zone; and
compare the resolution score to a resolution score threshold;
responsive to the resolution score for each of the subset being less than the resolution score threshold, increase an image score, wherein the image score is variable based on the one or more attributes;
and
responsive to the resolution score for at least one of the subset being greater than or equal to the resolution score threshold, reject the subset.

11. The non-transitory computer-readable storage medium of claim 7, wherein, to determine the one or more attributes and to accept or reject the subset, the computer program code instructions, when executed by the at least one processor, cause the at least one processor to:
for each of the subset:
determine a weather condition in which each of the subset was acquired; and
determine light attributes associated with each of the subset;
responsive to the weather conditions and the light attributes of all of the subset being consistent, increase the image score; and
responsive to the weather conditions and the light attributes of all of the subset being inconsistent, provide no change to the image score.

12. The non-transitory computer-readable storage medium of claim 7, wherein, to determine the one or more attributes and to accept or reject the subset, the computer program code instructions, when executed by the at least one processor, cause the at least one processor to:
compare the subset with each other;
responsive to the subset excluding any gap or overlap, increase the image score by a first amount;
responsive to the subset including at least one gap or overlap, determine the amount of gap or overlap between the subset;
responsive to the amount of gap or overlap being less than the resolution of each of the subset, increase the image score by a second lesser amount; and
responsive to the amount of gap or overlap being greater than or equal to the resolution, provide no change to the image score.

13. A method of assessing a plurality of geospatial aerial images for image processing, the method comprising:

receiving the plurality of geospatial aerial images, wherein each of the plurality of geospatial aerial image data represents a zone within a map;

receiving a selection of a bounding zone within the map for the image processing; and responsive to the bounding zone including a subset of the plurality of geospatial aerial images:

determining one or more attributes of the subset, wherein the one or more attributes is a resolution of each of the subset, an amount of area within the bounding zone covered by the subset, a clarity of each of the subset, an amount of gap or overlap between the subset, or a combination thereof; and accepting or rejecting the subset for the image processing based on the one or more attributes, wherein the determining the one or more attributes and accepting or rejecting the subset comprise:

comparing the subset with each other;

responsive to the subset excluding any gap or overlap, increasing an image score by a first amount, wherein the image score is variable based on the one or more attributes;

responsive to the subset including at least one gap or overlap, determining the amount of gap or overlap between the subset;

responsive to the amount of gap or overlap being less than the resolution of each of the subset, increasing the image score by a second lesser amount;

responsive to the amount of gap or overlap being greater than or equal to the resolution, providing no change to the image score;

responsive to the image score being equal to or greater than an image score threshold, accepting the subset; and responsive to the image score being less than the image score threshold, rejecting the subset.

14. The method of claim 13, wherein the subset is a first subset, wherein the one or more attributes is one or more first attributes, and wherein the method further comprises:

querying the plurality of geospatial aerial images for a second subset within the bounding zone;

determining one or more second attributes of the second subset, wherein the one or more second attributes is the resolution of each of the second subset, the amount of area within the bounding zone covered by the second subset, the clarity of each of the second subset, the amount of gap or overlap between the second subset, or the combination thereof; and accepting or rejecting the second subset for the image processing based on the one or more second attributes.

15. The method of claim 13, wherein the determining the one or more attributes and accepting or rejecting the subset comprise:

for each of the subset:

determining a resolution score, wherein the resolution score is a ratio of each of the subset and an area of the bounding zone; and comparing the resolution score to a resolution score threshold;

responsive to the resolution score for each of the subset being less than the resolution score threshold, increasing the image score;

and responsive to the resolution score for at least one of the subset being greater than or equal to the resolution score threshold, rejecting the subset.

16. The method of claim 13, wherein the determining the one or more attributes and accepting or rejecting the subset comprise:

determining a coverage score for the subset, wherein the coverage score is a ratio of a sum of all areas of the subset within the bounding zone and an area of the bounding zone;

comparing the coverage score to a coverage score threshold;

responsive to the coverage score being equal to or greater than the coverage score threshold, increasing the image score;

and responsive to the coverage score being less than the coverage score threshold, rejecting the subset.

17. The method of claim 13, wherein the determining the one or more attributes and accepting or rejecting the subset comprise:

for each of the subset:

determine a weather condition in which each of the subset was acquired; and determine light attributes associated with each of the subset;

responsive to the weather conditions and the light attributes of all of the subset being consistent, increase the image score; and responsive to the weather conditions and the light attributes of all of the subset being inconsistent, provide no change to the image score.

* * * * *